(12) United States Patent
Padisetty et al.

(10) Patent No.: US 8,104,043 B2
(45) Date of Patent: *Jan. 24, 2012

(54) SYSTEM AND METHOD FOR DYNAMIC COOPERATIVE DISTRIBUTED EXECUTION OF COMPUTER TASKS WITHOUT A CENTRALIZED CONTROLLER

(75) Inventors: Sivaprasad Padisetty, Redmond, WA (US); Shankar Manian, Redmond, WA (US); Hari S. Narayan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1061 days.

This patent is subject to a terminal disclaimer.

(21) Appl. No.: 10/720,893

(22) Filed: Nov. 24, 2003

(65) Prior Publication Data

US 2005/0114854 A1   May 26, 2005

(51) Int. Cl.
*G06F 9/46* (2006.01)
(52) U.S. Cl. ........................................ 718/106; 718/100
(58) Field of Classification Search .......... 718/105–106; 709/202, 226; 719/317
See application file for complete search history.

(56) References Cited

U.S. PATENT DOCUMENTS

| | | | |
|---|---|---|---|
| 4,969,092 A | 11/1990 | Shorter | |
| 5,535,387 A * | 7/1996 | Matsuoka et al. | 718/105 |
| 5,634,011 A | 5/1997 | Auerbach et al. | |
| 5,692,192 A * | 11/1997 | Sudo | 718/105 |
| 6,157,960 A | 12/2000 | Kaminsky et al. | |
| 6,167,431 A | 12/2000 | Gillies et al. | |
| 6,549,932 B1 | 4/2003 | McNally et al. | |
| 6,581,104 B1 | 6/2003 | Bereiter | |
| 6,934,755 B1 * | 8/2005 | Saulpaugh et al. | 709/226 |
| 7,159,217 B2 | 1/2007 | Pulsipher et al. | |

OTHER PUBLICATIONS

Jones et al. ("TASK Forces: Distributed software for Solving Problems of Substantial Size", Proceedings of 4th Software Engineering, Sep. 1979, pp. 315-330).*
Non-Final Office Action cited in U.S. Appl. No. 11/150,951 dated Mar. 19, 2008.
Final Office Action cited in U.S. Appl. No. 11/150,951 dated Oct. 15, 2008.
Advisory Action cited in U.S. Appl. No. 11/150,951 dated Jan. 29, 2008.

* cited by examiner

*Primary Examiner* — Meng An
*Assistant Examiner* — Eric C Wai

(57) ABSTRACT

A system and method is provided for cooperative execution of distributed tasks by networked computers without the use of a centralized controller to coordinate the task execution. Each computer has an execution agent that cooperates with the execution agents of the other computers to carry out the execution of a given sequence of tasks. The execution instructions for the task sequence are provided to a first computer in the selected set of computers for task execution. The first computer processes the instructions and forwards them to its peer computers so that each of them knows the tasks it is to perform in connection with the tasks of the other computers. The computers then executes the tasks assigned to them and use peer-to-peer communications to provide status update to their peer computers to synchronize and coordinate the task execution.

21 Claims, 4 Drawing Sheets

SYSTEM AND METHOD FOR DYNAMIC COOPERATIVE DISTRIBUTED EXECUTION OF COMPUTER TASKS WITHOUT A CENTRALIZED CONTROLLER

TECHNICAL FIELD

This invention relates generally to the controlled execution of tasks over a computer network, and more particularly to a computer framework for cooperative automated execution of distributed tasks by a set of computers without a centralized controller.

BACKGROUND OF THE INVENTION

Computer software and hardware operations, especially those that involve complex interactions between different computers such as those supporting various networking protocols and distributed transactions, often have to be extensively tested to ensure that they function properly. Typically, to test a given type of computer interactive operation, a set of test computers are chosen to run a test case that includes a sequence of tasks to be performed by different ones of the test computers in an interactive fashion. In one conventional test framework, the execution of the task sequence of the test run is controlled by a centralized test controller. The test control goes through the sequence of tasks one by one, instructs a corresponding test computer to carry out one task, receives the result of the task, and instructs another test computer to carry out the next task in the sequence based on the outcome of the previous task.

The use of a centralized controller to control the automated execution of distributed computer tasks, however, places a significant constraint on the availability of test computers. To enable the centralized control, each test computer is required to form a communication link with the centralized test controller to receive instructions and report task execution status and results. This requirement excludes many computers that do not have the capability of forming a direct network connection with the controller from being used for distributed computer testing.

SUMMARY OF THE INVENTION

In view of the foregoing, the present invention provides a framework for automated dynamic execution of distributed tasks by a set of computers without the need to use a centralized controller to coordinate the execution of the tasks. Although this framework is especially advantageous for the application of testing interactive computer operations, it can also be used to carry out other types of distributed tasks. In accordance with the invention, the execution of a sequence of tasks is coordinated through the cooperation of the peer computers selected to perform the tasks. Each computer has an execution agent for handling the cooperative execution of the tasks. Task execution instructions that identify the sequence of tasks to be executed and the corresponding computers that are to perform the individual tasks are given to a first computer in the set of selected computers. The first computer passes the task execution information on to the other peer computers involved in the distributed execution so that each computer knows which tasks it is to perform in relation to the tasks of the other computers. The execution agents of the computers then communicate with each other for status update and synchronize to execute the sequence of tasks.

DETAILED DESCRIPTION OF THE INVENTION

Figure 1:
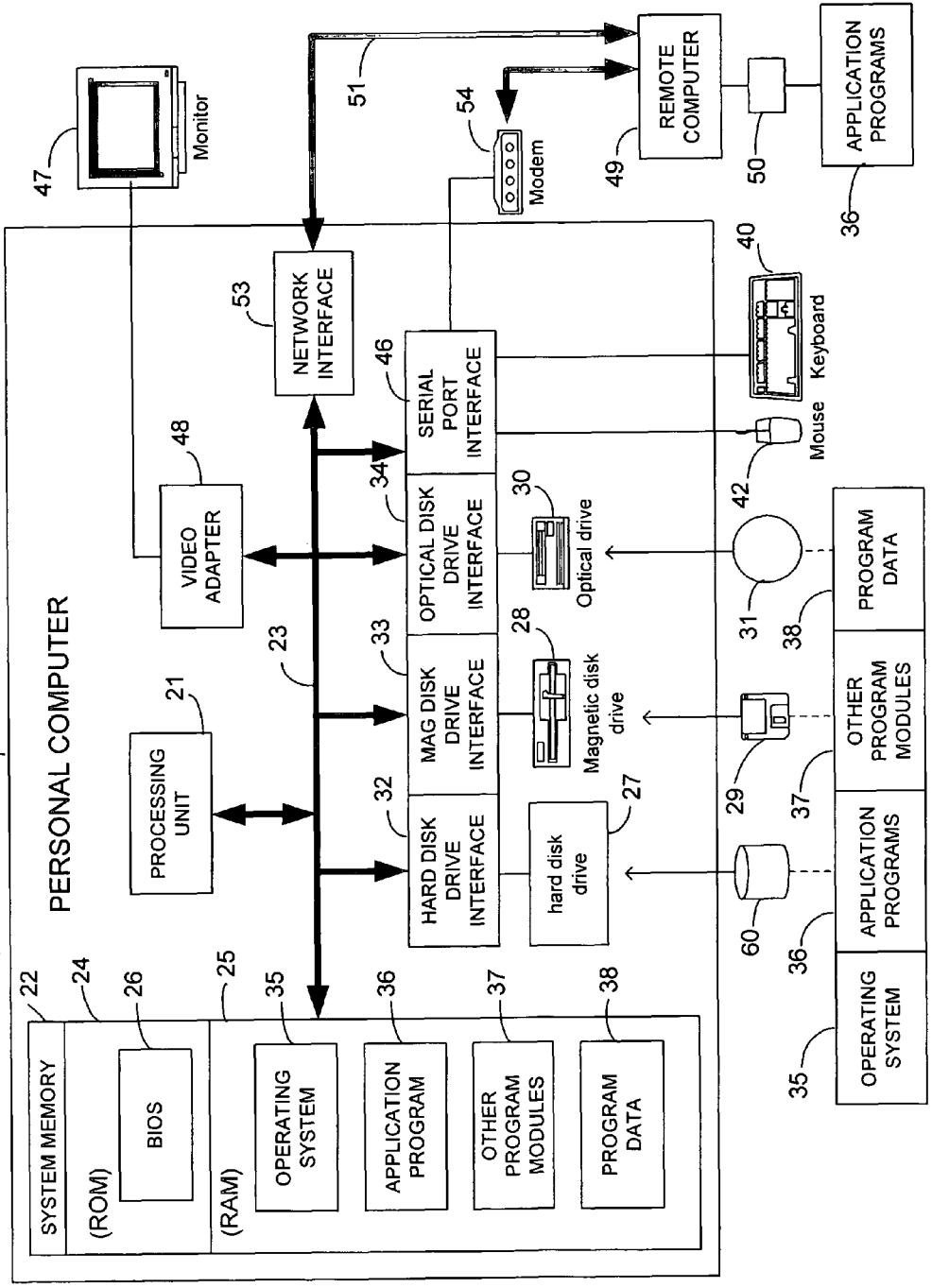
FIG. 1 is a block diagram generally illustrating an exemplary computer system on which an embodiment of an execution agent for cooperative execution of distributed tasks in accordance with the invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may implement components of a framework of the invention for coordinated execution of distributed tasks by a selected set of computing devices. The framework of the invention for cooperative distributed task execution without using a centralized controller will be described in greater detail with reference to FIGS. 2-4. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various ones of the acts and operations described hereinafter may also be implemented in hardware.

Figure 2:
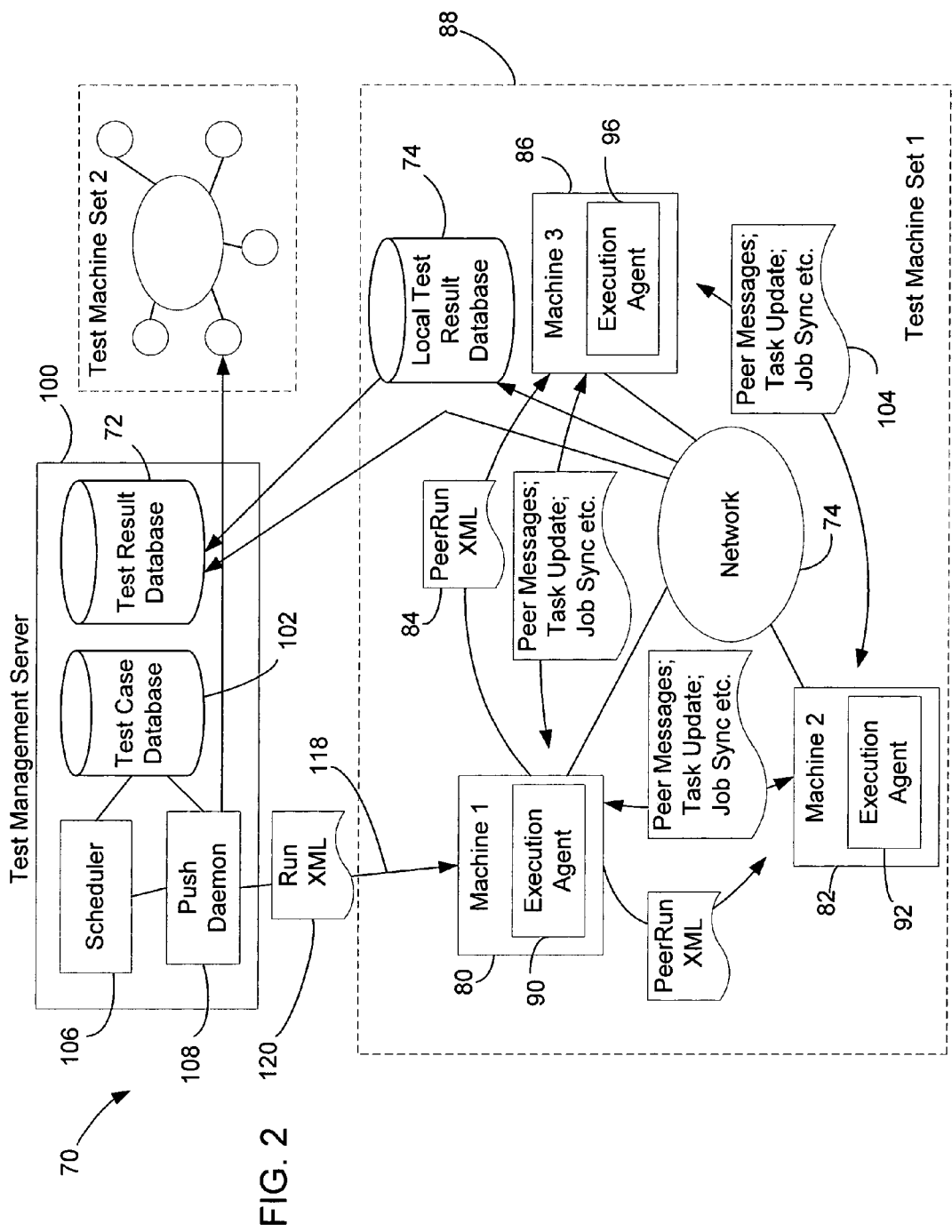
FIG. 2 is a schematic diagram showing an embodiment of a system that includes a set of computers for cooperative distributed execution of tasks of a test run.

Referring now to FIG. 2, the present invention is directed to a new framework 70 for automated execution of distributed tasks by a selected set of computers. In accordance with the invention, the sequence of distributed tasks is executed by the corresponding computers in an orderly fashion through the cooperative interactions among the computers. As a result, there is no need to use a centralized controller to coordinate and control the progress of the execution of the tasks. For simplicity of illustration, FIG. 2 shows only three computers 80, 82 and 86 in the machine set 88 for executing a given sequence of distributed tasks. It will be appreciated, however, that the number of computers required for carrying out a sequence of tasks depends on the particular sequence.

In a preferred embodiment as described below with reference to FIG. 2, the distributed task execution framework of the invention is used for the application of automated computer testing, and the following description will refer to the context of executing tasks involved in a computer test run. It will be appreciated, however, that the cooperative execution of distributed tasks of the invention is not limited to testing applications, and can be used equally well for executing other types of distributed tasks.

To carry out the distributed tasks without the help of a centralized controller, each of the computers 80, 82, 86 participating in the task execution is provided with an execution agent (EA) 90, 92 or 96. The execution agent 90 is responsible for launching the assigned tasks on the test machine 80 on which it resides, and for communicating with the execution agents 92, 96 on the other test machines 82, 86 to coordinate the execution of the distributed tasks of a test run. In one embodiment, the execution agent is implemented as part of a dynamic link library (.dll) for computer testing. The functionality of the execution agents will be described in greater detail below.

To facilitate the description of a preferred embodiment for computer testing operations, some basic concepts regarding automated execution by selected machines as used in the embodiment are first defined. Generally, a "task" is the smallest unit of execution by a machine. A "job" is a list of tasks, and a "run" is a list of jobs. A set of machines is reserved for a run. All machines participate in the execution of each job in the run even if they do not have any tasks of the job or even if that job's logical-to-physical machine mapping does not include that particular physical machine.

As implemented in the embodiment, there are three different types of tasks. An "Exe" task is a command line (anything that can be created as a process) to be executed. A "Copyfile" task copies a list of files from a source to a destination. A "RunJob" task has a pointer to another job. In this context, the job being pointed to is called a "subjob," which will be explained in greater detail below. The execution of the RunJob task is basically the execution of the subjob. When the execution agent encounters this task, it finds the associated subjob and executes it, and the task's pass/fail status is determined by the success/failure or the subjob. The common properties for all types of tasks include the user name under which the task is run, the password for the user name, the domain for the user credentials, and a FailureAction property that specifies the action to be taken by the execution agent if the task fails. Each task also has a TaskCategory property, which tells the execution agent what kind of task it is. This property in combination with the FailureAction property determines the course of action to be taken upon the failure of the task. Also, one of the common properties of the task is the "Logical Machine" to which the task is assigned. The MachineName, which is the name of the physical machine that is to actually execute the task, is "found out" by using the LogicalMachine and the LogicalMachine To Physical Machine Mapping.

In one implementation, there are five different categories of tasks: SetupJob, Regular, Cleanup, CleanupPass, and CleanupFail. The SetupJob tasks are precursors to the tasks that actually run the tests and may include any task that is needed to set up the machine, which can vary from copying source binaries to deploying an operating system. The Regular tasks are the tasks that actually run the tests. The Cleanup tasks are involved in any cleanup operation that needs to be done regardless of the success/failure of the Setup and Regular tasks. The CleanupPass tasks are involved in any cleanup operation that needs to be done upon the non-failure of the Setup and Regular tasks. In contrast, the CleanupFailure tasks are those that are involved in any cleanup operation to be done upon the failure of the job. Each task in any of the five categories can be of any type (Exe, Copy, or RunJob). As mentioned above, a "job" is a list of tasks. The tasks in a job may belong to different categories. Within the job the tasks are executed in the following order: Setup, Regular, Cleanup, and then CleanupPass or CleanupFail, depending on the status of the job at the end of the regular tasks.

In accordance with a feature of a preferred embodiment, a task may be the execution of a "subjob." A subjob is basically the same as a job except for a few differences. A subjob has a "parent" task (a RunJob task) that refers to it, and the subjob is executed as part of running the parent task within some other job, which is referred to as the ParentJob in this context. When the list of tasks of a given test run is given to the test machines, a subjob may be referred to without specifying on which physical machines the subjob is to run. In that case, the subjob will be executed on the machine on which the parent task is supposed to run. On the other hand, if a mapping to a physical machine is specified for a subjob, the subjob will be executed on that machine.

Generally, when a sequence of tasks is given to a set of test computers, the execution instructions may identify the assignment of those tasks with respect to a set of logical machines, and provide a mapping between the logic machine set to the physical machines selected to carry out the tasks. For instance, the instructions may state that task number 5 is to be performed by logical machine A, which is mapped to physical machines X and Y. In that case, further splitting of the tasks with respect to the physical machines may be required. In one embodiment, if the logical machine a task is supposed to run is mapped into two or more physical machines, the task is split into as many tasks to have one task per physical machine. The splitting is achieved by making a copy of the task and changing the MachineName property of the task to the name of the physical machine that will run the task. If the task is a RunJob task that refers to a subjob with mapping, the task is not split, and the MachineName of the task is changes to the list of machine names specified by the subjob's mapping. If the RunJob task does not specify the logical-to-physical machine mapping for the subjob, then the subjob is also split with one subjob per task. The task dependencies are adjusted accordingly after the splitting of the tasks.

To use the set 88 of test machines to execute the sequence of tasks for a test run, task execution instructions are provided to one of the test machines. In the illustration of FIG. 2, the computer 80 is used for that purpose. The task execution instructions are generated by a test management server 100, which includes a test case database 102 and scheduler 106. The scheduler 106 takes a test run and finds a set 88 of available test machines for running the test case. The test management server 100 further includes a push daemon 108 for delivering the task execution instructions to the group of test computers. If a network connection 118 is formed between the push daemon 108 and the computer 80, the push daemon may send the execution instructions to the computer 80 via the network connection. Alternatively if there is no network connection available between the test management server 100 and any of the test computers 80, 82 and 86, the execution instructions may be loaded onto the computer 80 using a transportable medium, such as a CD-ROM. The execution instructions identify the tasks and the order in which they are to be executed, and which test computer is to perform which task. In other words, the execution instructions provide information for each test computer involved in the test run to know what its tasks are in relation to the tasks of the other computers. In accordance with a feature of a preferred embodiment, the execution instructions are provided in the form of an XML file or document. The XML file allows easy viewing and editing and provides a standard format for the execution instructions to be coded.

Figure 3:
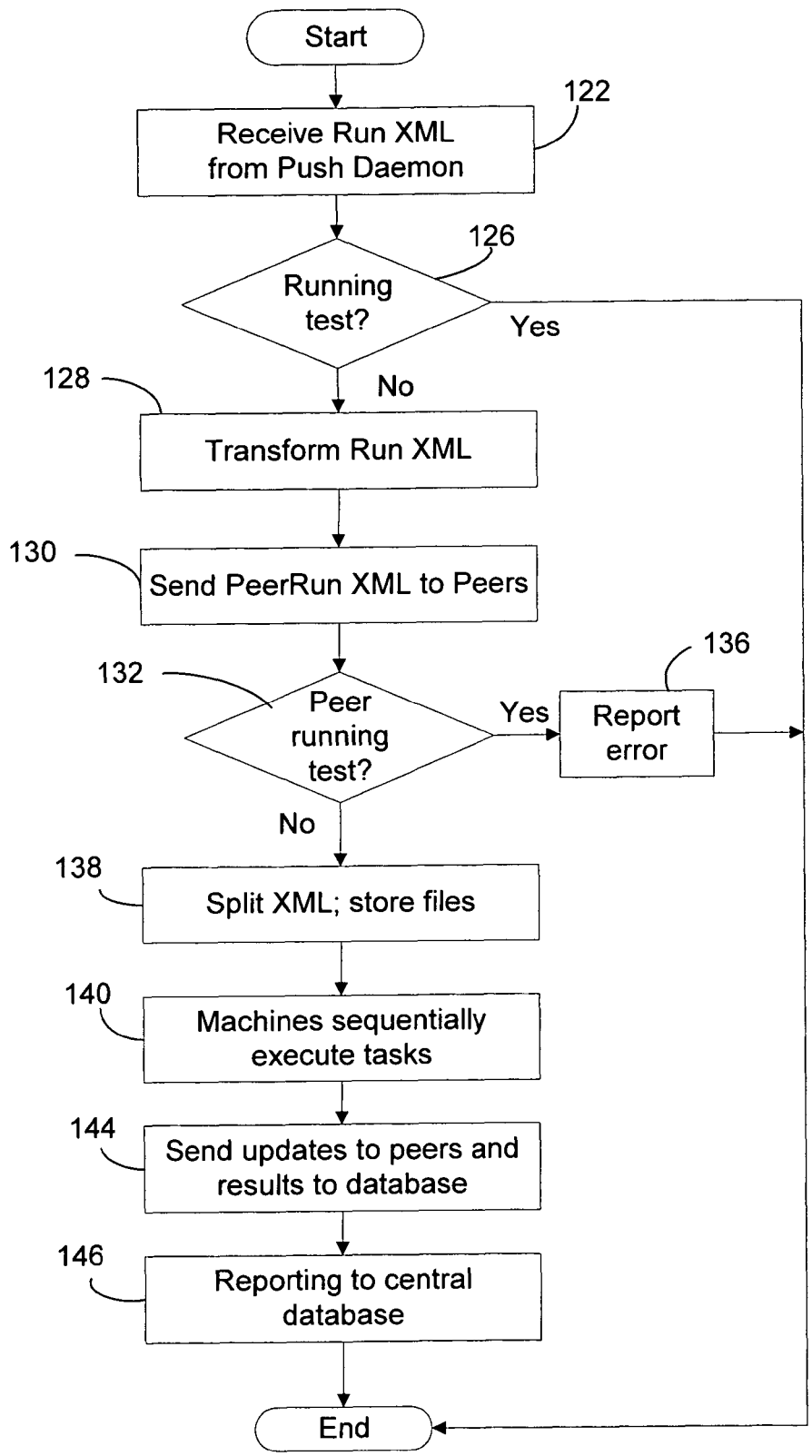
FIG. 3 is a flow diagram summarizing the operation of execution agents on selected computers in an embodiment of the invention for automated execution of distributed tasks without a centralized controller.

Referring now to FIGS. 2 and 3, to initiate a test run, the Push Daemon 108 of the test management server 100 sends a Run XML file 120 that contains the execution instructions for a test run to the execution agent 90 on the computer 80 in the set of computers selected for executing the test run (step 122). When the execution agent 90 of the first computer 80 receives the Run XML document, it first checks to see if it is already running any other test run (step 126). If so, it rejects the message and exits the run process. If it is not running any other test, it calls a EaCreateRunTimeXML API function to transform the Run XML (step 128). This transformation involves splitting the tasks specified in the Run XML document, adjusting the dependencies of the tasks, and adjusting the subjobs, if any. As part of this reformatting operation, the execution agent splits the Run XML into several smaller XML files, including one XML file for each job of the test run and a global JobList XML file that contains a list of all jogs of the test run. It also forms a concatenated version of all of these XML files that is called a "PeerRun XML." The execution agent on the first machine then identify the other machines involved in the run by reading the list of the test machines from the Global JobList XML, and sends the PeerRun XML file to each of the other machines (step 130). When the execution agent on a peer machine 82 receives the PeerRun XML 84, it recognizes the document to be from the execution agent of the first machine. If the peer machine is already involved in another test run (step 132), its execution agent 92 returns an error message to the first machine 80 (step 136). Otherwise the execution agent of the peer machine splits the concatenated XML files and store them in the memory (step 138). Once every machine involved in the test run receives the execution instructions in the XML files, each test machine starts running the test jobs one by one sequentially according to the test XML files (step 140) and sends the results of the test jobs to the test result database 72 In executing the tasks of the test run, the execution agent of each test machine communicate with all the execution agents of the other test machines by sending messages 104 that provide status updates to everyone (step 144). They also synchronize with each other at the beginning of every run or job to make sure that all the machines start at the same time. If the machines do not have direct network connections to the test result database 72 of the test manager server, the test results may be sent to a local database 74. Once all the jobs of the test run are completed, the test results collected by the local database 74 may be sent to the database 72 of the test management server 100 for diagnoses and reporting.

In a preferred embodiment, the execution agent has several important high-level features. First, the execution agent can execute a job involving multiple peer test machines. It accomplishes this by using peer-to-peer messaging, whereby the execution agents running all the test machines synchronize with each other and receive the up-to-date status of what is happening on all the other test machines.

During the course of executing a job, a test machine may be taken off the network. The execution agent is programmed to support such a scenario and will resume communications with the other machines when its machine comes back online. Jobs can also span over reboots. To handle that scenario, the execution agent stores its state information on the file system of the local machine and will recover its state when the machine reboots and resume execution. The execution agent also supports the installation of an operating system on the local machine as part of the test job. If the machine has multiple partitions, it also supports fresh installations of the operating system with formatting and deploying an image in the machine. In that case, the execution agent will continue the execution of the test run tasks after the new operating system boots up on the machine.

To ensure the reliability of the test results, the execution agent is preferably built such that any kind of failure is either recovered or reported for follow-up. If one of the test machines for a job is hung or out of reach for some reason, the execution agents on the other machines detect it and cancel the current execution and report a failure. It also takes care of hooking into the debugger for both user mode and kernel mode breaks on the machines.

The execution agent also provides functionality to collect test and system information after the execution of the job. Different information gathering commands can be executed based on the outcome of the job. The job can request for minimal logs to be gathered if the job passes and for detailed logs to be captured if the job fails. Failure actions are supported by the execution agent. If any task in the job fails, the job can request for many different kinds of actions to be taken. The job can be canceled, and a set of failure commands can be executed to collect information about the system and the job for later diagnosis. The job can also be defined to recover the machine back to a good state if the failure leaves the test machine in a bad state. In this case, the machines are recovered and returned to the available test machine pool so that new test jobs can be assigned to this machine.

Tests can be defined in great detail. Apart from giving the actual command line to be executed for an executable task, the user can also specify the credentials of which user account to run the task under. The user can also specify which computer is to be used as a monitor for showing the process status or to create a new monitor session for the task. The execution agent also supports the ability for any execution to be canceled at any point of time. The cancel request is processed and passed on to all the peer machines, and the cleanup processes are executed. The machines are then returned back to the free machine pool for further job assignments. The execution agent is incorporated with error logging to the database for any kind of failures so that all information is available from the user interface for the user to diagnose the issues.

Figure 4:
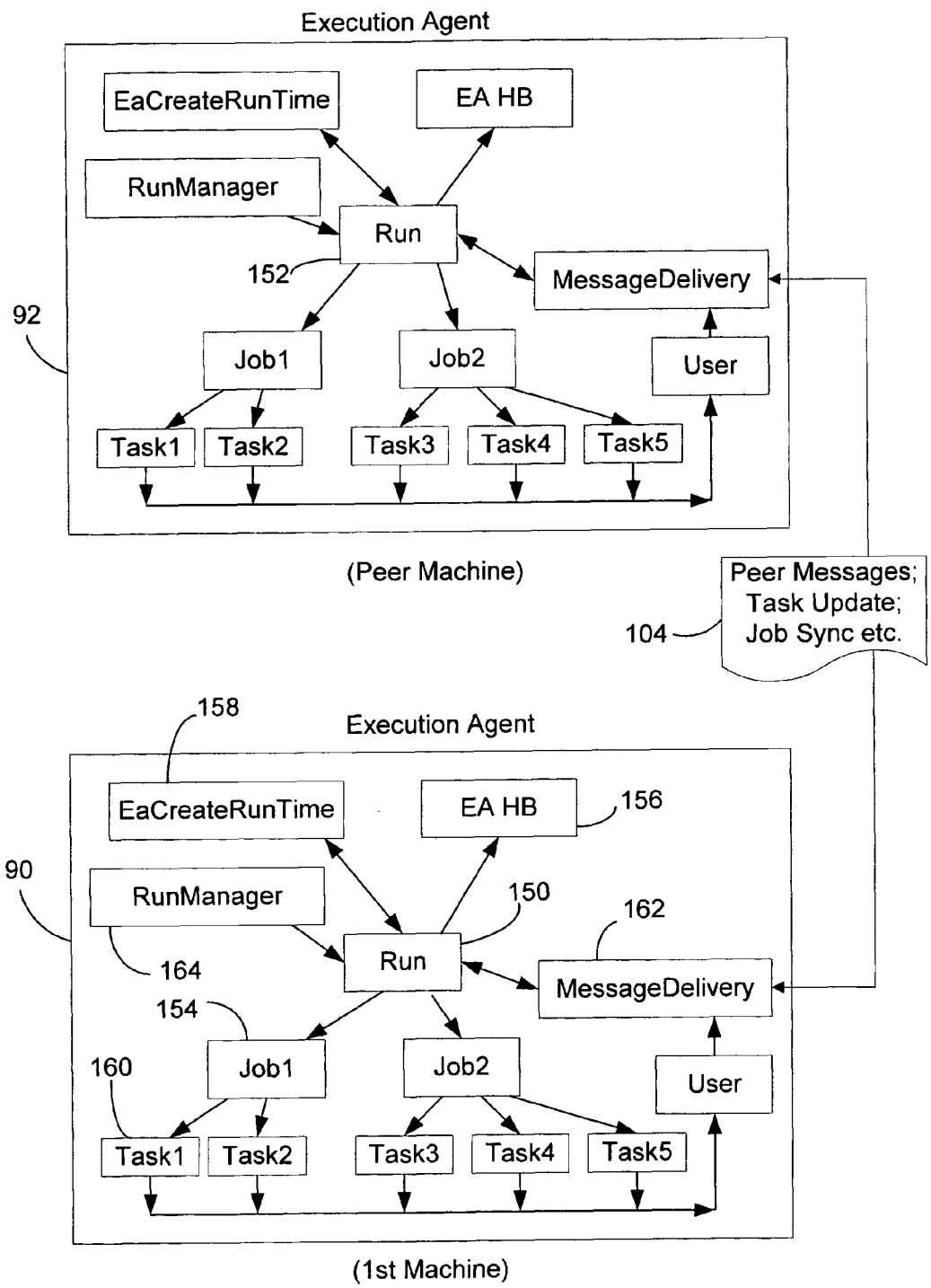
FIG. 4 is a schematic diagram showing the structure of execution agents on the computers in the system of FIG. 2 for carrying out the coordinated execution of distributed tasks by the computers.

Turning now to FIG. 4, in one implementation, the execution agent 90 has several major components. The Run object handles a test run. If the run is a multi-machine operation, and the machine on which the execution agent resides is the first machine to be called with the Run XML, the Run object 150 processes the Run XML to split it and produce a series of smaller XML files to work with, and sends the concatenation of all the processed XML files to the other machines involved in the test run. On the other hand, if the local machine is not the first machine as in the case of the computer 82 and is instead receiving the concatenated XML, the Run object 152 splits the concatenated XML and stores the files. The Run object 150 or 152 then instantiates Job objects 154, one for each job present in the test run, and initialize them. The Job objects 154 are grouped according to the execution phase they belong to (e.g., Setup, Regular, and Cleanup). The Run object of each computer initializes all common data by providing accessors for Job and Task objects to access them, and executes the jobs in a sequential order according to the execution instructions in the XML files. During the test run, the Run objects synchronizes the execution of each job in all the machines such that at any point of time all the machines involved run the same job. The Run object of each computer also initializes and starts an EA HB object 154 for maintaining a "heartbeat" with all the peer machines. The run is canceled upon failure of heartbeat (i.e., the peer machine being unresponsive) for three consecutive times. The Run object is also responsible for sending updates to the peer machines and the result database at the beginning and completion of the run.

The Job object 154 instantiates Task objects 160 for each task of the run that is to be performed by the local machine and initializes them. The Task objects 160 are grouped according to the execution phase they belong to. The Job object 154 manages the dependency between the tasks, which involves executing only those tasks that do not have any dependency (i.e., pending the completion of another task) at that given time, and at the completion of a task removing the dependencies from other tasks that have dependency on this task. Generally, a job is a multi-machined entity, and there is on Job object in each test machine for each job. All the Job objects on the test machines talk to each other to coordinate the task execution and dependencies. Each Job object sends updates to the peer machines and the database at the beginning and completion of the associated job.

The Task object 160 is responsible for executing an associated task in a specified user context and terminal session. It has the ability to cancel or kill the task, if needed. The Task object 158 sends updates to the peer machines and the database at the beginning and completion of the task.

The MessageDelivery object 162 is responsible for delivery of messages to the peer machines. It gets the routing information from the Run XML and constructs the headers to the peer machines and the database. To that end, it has to exposed functions: SendMessageToPeers and SendMessageToSource. It also maintains a list of the peer machines for reference.

The EaCreateRunTimeXML object 158 is called by the Run object 150 to process the input Run XML file and splits the file into various smaller XML files as described above. It also handles the mapping from logical machines to physical machines for the tasks and subjobs.

The EA SDK objects are a group of APIs that are used to interface with the execution agent. The EaCreate function creates an instance of the execution agent. It takes the Run XML as the input and returns a handle for the execution agent. It is signaled on completion of the run. The EaWaitForMultipleObjects is used to wait on the execution agent handles. The EaSignal function is used to signal the execution agent and to cancel the execution agent. The EaQueryStatus function, when invoked, returns the status of the run at that point of time in an XML format. The EaClose function closes the handle for the execution agent.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable medium comprising computer-executable instructions stored thereon which, when executed by a first computer in a group of peer computers, performs actions for coordinated execution of distributed tasks, the actions comprising:
    receiving from at least one server, by the first computer in the group of peer computers, respective peer computers in the group of peer computers comprising at least one processing unit and one input device and one output device distinct from the at least one processing unit, a first XML document comprising a set of execution instructions for the peer computers, the execution instructions comprising a sequence of tasks to be performed and an automatically, without user action, determined assignment of the tasks to the peer computers;
    forwarding, by the first computer in the group of peer computers to the other peer computers in the group, a second XML document comprising execution instruction information derived by the first computer from the first XML document comprising the execution instructions, the execution instruction information that is forwarded to respective peer computers in the group informing the respective peer computers of a dependency between one or more tasks assigned to the respective peer computers and one or more tasks assigned to the other peer computers in the group of peer computers;
    executing, by the first computer, a portion of the sequence of tasks assigned thereto in connection with execution of other of the sequence of tasks assigned to the other peer computers in the group; and
    receiving, by the first computer from respective other peer computers, and transmitting, by the first computer to the respective other peer computers, peer-to-peer communication messages comprising task execution status information to synchronize and coordinate the execution of the sequence of tasks, the task execution status information comprising an indication that one task upon which another task depends has completed.

2. A computer-readable medium as in claim 1, the sequence of tasks to be performed comprising a test run of interactive computer operations.

3. A computer-readable medium as in claim 1, the execution instructions comprising a job that executes a predefined set of tasks.

4. A computer-readable medium as in claim 1, one or more results of execution of tasks reported to a test result database.

5. A computer-readable medium as in claim 1, respective computers of the group of computers comprising an execution agent.

6. A computer-readable medium as in claim 5, the execution agent configured to handle cooperative execution of one or more tasks.

7. A computer-readable medium as in claim 1, comprising computer executable instructions stored thereon for the first computer to report results of execution of tasks to a database.

8. A method of performing coordinated execution of distributed tasks by a group of peer computers, comprising:
    receiving from at least one server, by a first computer in the group of peer computers, respective peer computers in the group of peer computers comprising at least one processing unit and one input device and one output device distinct from the at least one processing unit, a first XML document comprising a set of execution instructions for the peer computers, the execution instructions comprising a sequence of tasks to be performed and an automatically, without user action, determined assignment of the tasks to the peer computers;
    forwarding, by the first computer in the group of peer computers to the other peer computers in the group, a second XML document comprising execution instruction information derived by the first computer from the first XML document comprising the execution instructions, the execution instruction information that is forwarded to respective peer computers in the group informing the respective peer computers of a dependency between one or more tasks assigned to the respective peer computers and one or more tasks assigned to the other peer computers in the group of peer computers;
    executing, by the first computer, a portion of the sequence of tasks assigned thereto in connection with execution of other of the sequence of tasks assigned to the other peer computers in the group; and
    receiving, by the first computer from respective other peer computers, and transmitting, by the first computer to the respective other peer computers, peer-to-peer communication messages comprising task execution status information to synchronize and coordinate the execution of the sequence of tasks, the task execution status information comprising an indication that one task upon which another task depends has completed.

9. A method as in claim 8, the sequence of tasks to be performed comprising a test run of interactive computer operations.

10. A method as in claim 8, the execution instructions comprising a job that executes a predefined set of tasks.

11. A method as in claim 8, comprising automatically executing distributed tasks without a centralized controller.

12. A method as in claim 8, respective computers of the group of computers comprising an execution agent.

13. A method as in claim 12, the execution agent configured to handle cooperative execution of one or more tasks.

14. A method as in claim 8, comprising reporting results of execution of tasks by the peer computers to a database.

15. A computer system for performing automated execution of distributed tasks, comprising;
    a plurality of peer computers connected by a network, at least one of the peer computers comprising:
        at least one processing unit;
        at least one input device distinct from the at least one processing unit;
        at least one output device distinct from the at least one processing unit; and
        an execution agent programmed for:
            receiving a first XML document comprising a set of execution instructions for the peer computers, the execution instructions comprising a sequence of tasks to be performed and an automatically, without user action, determined assignment of the tasks to the peer computers;

forwarding to the execution agents on the other peer computers a second XML document comprising execution instruction information derived by the execution agent from the first XML document comprising the execution instructions, the execution instruction information forwarded to respective peer computers informing the respective peer computers of a dependency between one or more tasks assigned to the respective peer computers and one or more tasks assigned to another of the plurality of peer computers;

executing a portion of the sequence of tasks in connection with execution of other of the sequence of tasks assigned to the other peer computers; and receiving from respective other peer computers and transmitting to the respective other peer computers peer-to-peer communication messages comprising task execution status information to synchronize and coordinate the execution of the sequence of tasks, the task execution status information comprising an indication that one task upon which another task depends has completed.

16. A computer system as in claim 15, the sequence of tasks to be performed comprising a test run of interactive computer operations.

17. A computer system as in claim 15, the execution instructions comprising a job that executes a predefined set of tasks.

18. A computer system as in claim 15, the computer system configured to automatically execute distributed tasks without a centralized controller.

19. A computer system as in claim 15, the execution agent programmed to split one or more XML documents to produce a plurality of smaller XML files.

20. A computer system as in claim 19, the execution agent programmed to send a concatenation of one or more processed XML files to one or more other computers.

21. A computer system as in claim 15, comprising a test result database, the execution agent of respective peer computers programmed for reporting results of execution of tasks to the test result database.

\* \* \* \* \*